US009425445B2

(12) United States Patent
Kreutzer et al.

(10) Patent No.: US 9,425,445 B2
(45) Date of Patent: Aug. 23, 2016

(54) BATTERY HAVING A PLURALITY OF BATTERY CELLS

(75) Inventors: Christoph Kreutzer, Ingolstadt (DE); Heinz-Willi Vassen, Buxheim (DE); Robert Schwarzbauer, Inchenhofen (DE); Heiner Fees, Bietigheim-Bissingen (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 13/980,823

(22) PCT Filed: Jan. 18, 2012

(86) PCT No.: PCT/EP2012/000212
§ 371 (c)(1),
(2), (4) Date: Jul. 19, 2013

(87) PCT Pub. No.: WO2012/097980
PCT Pub. Date: Jul. 26, 2012

(65) Prior Publication Data
US 2013/0295437 A1  Nov. 7, 2013

(30) Foreign Application Priority Data
Jan. 21, 2011  (DE) .................. 10 2011 009 102

(51) Int. Cl.
*H01M 2/10* (2006.01)
*H01M 8/24* (2016.01)
(Continued)

(52) U.S. Cl.
CPC .......... *H01M 2/1077* (2013.01); *H01M 2/1083* (2013.01); *H01M 8/248* (2013.01); *H01M 2/02* (2013.01); *H01M 2/04* (2013.01); *Y02E 60/50* (2013.01)

(58) Field of Classification Search
CPC ............. H01M 2/1083; H01M 8/248; H01M 2/1077; H01M 2/02; H01M 2/04; Y02E 60/50; Y02E 60/12
USPC ................................................. 429/149–160
See application file for complete search history.

(56) References Cited

U.S. PATENT DOCUMENTS 6,190,793 B1   2/2001 Barton et al.
7,214,530 B2   5/2007 Sayre et al.
(Continued)

FOREIGN PATENT DOCUMENTS

CN   1641234   7/2005
DE   555827    7/1932
(Continued)

OTHER PUBLICATIONS

International Search Report issued by the European Patent Office in International Application PCT/EP2012/000212 on Apr. 24, 2012.
(Continued)

*Primary Examiner* — Milton I Cano
*Assistant Examiner* — Ling R Zeng
(74) *Attorney, Agent, or Firm* — Henry M. Feiereisen LLC

(57) ABSTRACT

The invention relates to a battery (10) having a plurality of battery cells (12) which form a cell stack (14) which stands on a bottom plate (18) of the battery (10). At least one wedge (20, 22) is provided to brace the battery cells (12) against one another. The at least one wedge (20, 22) and the cell stack (14) are secured in their position relative to the bottom plate (18) by at least one bracket (24) which is mounted to the bottom plate (18). Manufacturing tolerances of the battery cells (12) can be compensated by the at least one wedge (20, 22), and the bracket (24) secures both the wedge (20, 22) and the cell stack (14).

9 Claims, 1 Drawing Sheet

(51) Int. Cl.
*H01M 2/02* (2006.01)
*H01M 2/04* (2006.01)

(56) References Cited

U.S. PATENT DOCUMENTS

| | | |
|---|---|---|
| 7,389,841 B2 | 6/2008 | Boville |
| 2004/0016455 A1 | 1/2004 | Oogami |
| 2004/0144908 A1* | 7/2004 | Shannon, Jr. .............. 248/505 |
| 2006/0093890 A1* | 5/2006 | Steinbroner ............... 429/37 |
| 2007/0052390 A1* | 3/2007 | Kim et al. ................. 320/116 |
| 2009/0226793 A1* | 9/2009 | Suh et al. ................. 429/34 |
| 2009/0239137 A1 | 9/2009 | Kakuchi et al. |

FOREIGN PATENT DOCUMENTS

| | | |
|---|---|---|
| DE | 24 37 384 | 2/1975 |
| DE | 196 28 398 | 8/1997 |
| DE | 199 39 370 | 2/2001 |
| DE | 102007007956 | 8/2008 |
| EP | 0 291 918 | 11/1988 |
| GB | 1 475 732 | 6/1977 |
| JP | 06-188023 | 7/1994 |
| JP | 11-067176 | 3/1999 |
| JP | 2005-142049 | 6/2005 |
| WO | WO 2004/006359 | 1/2004 |
| WO | WO 2005/045981 | 5/2005 |

OTHER PUBLICATIONS

Chinese Search Report with respect to counterpart Chinese patent application 201280005987.5.

Translation of Chinese Search Report with respect to counterpart Chinese patent application 201280005987.5.

\* cited by examiner

BATTERY HAVING A PLURALITY OF BATTERY CELLS

CROSS-REFERENCES TO RELATED APPLICATIONS

This application is the U.S. National Stage of International Application No. PCT/EP2012/000212, filed Jan. 18, 2012, which designated the United States and has been published as International Publication No. WO 2012/097980 and which claims the priority of German Patent Application, Serial No. 10 2011 009 102.5, filed Jan. 21, 2001, pursuant to 35 U.S.C. 119(a)-(d).

BACKGROUND OF THE INVENTION

The invention relates to a battery having a plurality of battery cells which form a cell stack placed upon a bottom plate of the battery. The battery has at least one wedge for bracing the battery cells against one another.

Lithium-ion batteries which can be used as an energy store in a motor vehicle, include a plurality of battery cells typically in the form of a flat cube which are braced with a defined force. This provides safety during operation of the battery and is important with respect to the durability of the battery. A force is hereby applied upon the cell stack to thereby resist a mechanical deformation caused by the internal pressure prevailing in the battery cells.

Due to manufacturing tolerances and because the internal pressure of the battery cells fluctuates in dependence on the charging condition, ambient temperature and aging, the thickness of the cell stack may change. The cell stack thus acts at operation basically like a spring. By bracing the battery cells against one another, such changes in the thickness of the cell stack are compensated and it is ensured that they are held within mechanical limits—as specified for example by the manufacturer.

In particular when using a greater number of battery cells in the battery, the manufacturing tolerances of the battery cells placed side-by-side in the cell stack and of the bracing elements can add up to a considerable magnitude so that maintaining a required bracing force has proven difficult. Also, a decrease of manufacturing tolerances of the components of the battery is relatively complicated.

US 2009/0239137 A1 describes a lithium-ion battery with a cell stack having a plurality of battery cells and accommodated in a housing of the battery. A first sidewall of the housing bears flatly upon a side of the cell stack. An opposite sidewall of the housing extends from a bottom plate of the housing upwardly in a wedge-shaped manner. A wedge is inserted from atop into the tapered intermediate space between the cell stack and this side wall, so that the battery cells of the cell stack are braced against one other. The inserted wedge is secured by a screw passed through the wedge-shaped sidewall.

In U.S. Pat. No. 7,241,530 B2, which also relates to a lithium-ion battery, two complementary wedges are arranged in a battery housing which accommodates the cell stack, one of which resting against one side of the cell stack and the other one of which on a rib formed on a sidewall of the housing.

Furthermore, WO 2005/045981 A1 discloses a method for bracing fuel cells of a fuel cell stack by means of tie bolts which extend through an upper end plate and are screwed to an opposite lower end plate. A pressure plate provided with conically tapering marginal areas is situated between the upper end plate and the stacked fuel cells. By tightening setscrews, which are passed through lateral legs of the upper end plate, two wedges can be inserted from outside between the conical marginal areas and the end plate to thereby increase the force for bracing the fuel cell stack.

Constructions known in the art for bracing the cell stack of a battery have shown to be comparably cumbersome when it comes to achieving fixation of the components of the battery.

SUMMARY OF THE INVENTION

It is therefore an object of the present invention to provide a battery of the aforementioned kind which enables a securement of components of the battery in a particularly simple manner.

This object is attained by a battery having a plurality of battery cells, which form a cell stack resting on a bottom plate of the battery, and at least one wedge for bracing of the battery cells against each other, wherein at least one bracket is mounted on the bottom plate and secures the at least one wedge and the cell stack in their position in relation to the bottom plate. Advantageous embodiments with suitable refinement of the invention are set forth in the dependent claims.

The battery according to the invention includes at least a bracket mounted on the bottom plate and securing the at least one wedge and the cell stack in their positions in relation to the bottom plate. By inserting the wedge, the battery cells of the cell stack can be braced against each other with a desired force. The wedge can then be fixed in its position that effects the desired bracing by securing the bracket to the bottom plate. At the same time, by securing the at least one bracket upon the bottom plate, the cell stack is held securely in position on the bottom plate. By simply bracing the battery cells against each other using the at least one wedge, manufacturing tolerances, such as of the battery cells and/or the bracket, can be compensated especially easily. In addition, using the bracket, several components of the battery, i.e. the wedge and the cell stack, can be fixed in a particularly simple and safe manner. For that purpose, only the working step to secure the position of the wedge is necessary. Moreover, such a battery can be realized with a particularly simple structure.

The cell stack can be secured in place especially well, when, according to an advantageous embodiment of the invention, the at least one bracket has a U-shaped configuration and spans the cell stack.

It has been shown as further advantageous, when the at least one wedge is guided on a leg of the at least one bracket. As a result, the wedge can be pushed down in order to adjust a bracing force acting upon the cell stack in an especially simple manner. In addition, the at least one wedge can be pre-fixed to thereby facilitate handling of bracket and wedge during installation of the battery.

At least a first wedge is preferably located on a first side of the cell stack, and at least a second wedge is preferably located on a second side of the cell stack. This allows a particularly good compensation of manufacturing tolerances and a very accurate adjustment of the bracing force to be provided.

It has further been shown to be advantageous, when the cell stack bears upon at least one side plate of the battery, which side plate has at least in some areas a wedge shape which complements the at least one wedge. As a result, the wedge bears upon the side plate in a flat manner and in a manner that is advantageous for the pressure application upon the cell stack. As a result of the slanted, complementing surfaces of wedge and side plate, manufacturing tolerances of the battery cells of the cell stack, the side plate and the bracket can be compensated in a particularly good way.

It has been shown as further advantageous, when at least a screw nut or a screw is provided for securing the at least one bracket upon the bottom plate. In this way, it becomes possible to brace the cell stack upon the bottom plate in addition to the securement of the wedge in a position that ensures a bracing of the battery cells.

It is further preferred that the at least one bracket is formed from a spring steel. In this way, a force imposed on the bracket and caused by the cell stack acting as spring can be compensated particularly well.

Finally, it has been shown to be advantageous, when the at least one bracket elastically compensates a force of 1 kN to 5 kN. During operation of a lithium-ion battery, the bracing means are typically subjected to forces in the range of 1 kN to 4 kN on. The spring force of the cell stack acting as spring may deviate by ±35% to ±40% from a normal value. Also in view of this behavior of the cell stack, the elastic reaction of the at least one bracket is advantageous.

Very high internal pressures can occur, when battery cells of a lithium-ion battery malfunction. The at least one bracket is then subjected to forces which can amount to a multiple of forces encountered during normal operation, i.e. a multiple of the afore-mentioned 1 kN to 4 kN. In addition or as an alternative, it is advantageous, when the at least one bracket is able to withstand without destruction an exposure to a force which is a multiple, especially 10 times to 15 times, of an elastically compensatable force.

The features and combinations of features as set forth above in the description and the individual features and combinations of features as set forth in the following description of the figures and/or shown in the figures are applicable in the respectively indicated combination but also in other combinations or taken alone, without departing from the scope of the invention.

BRIEF DESCRIPTION OF THE DRAWING

Further advantages, features and details of the invention are set forth in the claims, the following description of preferred embodiments and with reference to the drawings. It is shown in:

DETAILED DESCRIPTION OF PREFERRED EMBODIMENTS

Figure 1:
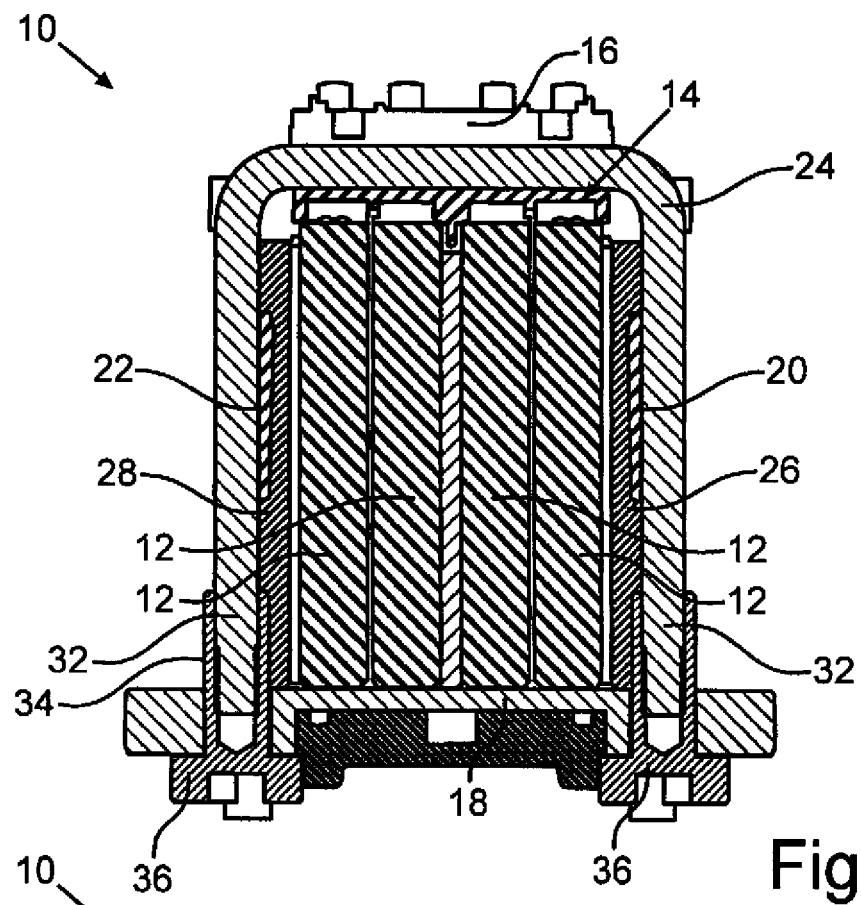
FIG. 1 a sectional view of a lithium-ion battery having a bracket which spans a cell stack, with battery cells of the cell stack being braced by wedges.

A lithium-ion battery 10 includes a plurality of battery cells 12 which form a cell stack 14. A head portion 16 sits on the cell stack 14. The battery cells 12, of which four pieces are shown here by way of example, have the shape of a flat block with the respective narrow sides standing on a bottom plate 18 of the battery 10. In alternative embodiments, the cell stack 14 can have significantly more battery cells 12. The battery cells 12 of the cell stack 14 are braced against one another by wedges 20, 22, with a defined force acting on the contacting sides of the battery cells 12 to hold the cell stack 14 together.

In the manufacturing process of the battery 10, the cell stack 14 is acted upon by a defined bracing force applied by a (not shown) clamping device to maintain the battery cells 12 tightly together. An intermediate space is formed between a U-shaped bracket 24 spanning the cell stack 14 and side plates 26, 28 which enclose the cell stack 14. In order to maintain the bracing force, the two wedges 20, 22 are pressed downwards in this intermediate space, whereupon the (not shown) clamping device can be removed again.

A first wedge 20 is located between the bracket 24 and the right-hand side plate 26, and a second wedge 22 is located between the bracket 24 and the left-hand side plate 28. The side plates 26, 28 have longitudinal grooves 30 (cf. FIG. 2) in which the wedges 20, 22 are guided. In the region of the longitudinal grooves 30, the side plates 26, 28 have a wedge shape which complements the wedge shape of the respectively adjacent wedge 20, 22.

The wedges 20, 22 are elongated in a vertical direction, have inclined wedge surfaces extending downwards, and embrace legs of the bracket 24 which extends from the head portion 16 to the bottom plate 18 of the battery 10 so that the wedges 20, 22 are guided on the bracket 24 and also in the longitudinal grooves 30 of the side plates 26, 28.

The cell stack 14 is braced by downwardly pushing the wedges 20, 22, attached on both sides of the bracket 24, into the longitudinal grooves 30 until resting upon the side plates 26, 28 free of play. At the same time, manufacturing tolerances of the battery cells 12, the side members 26, 28 and the bracket 24 can be compensated. By pushing the wedges 20, 22 downwards, the force for bracing the battery cells 12 against one another can be adjusted particularly well.

Figure 2:
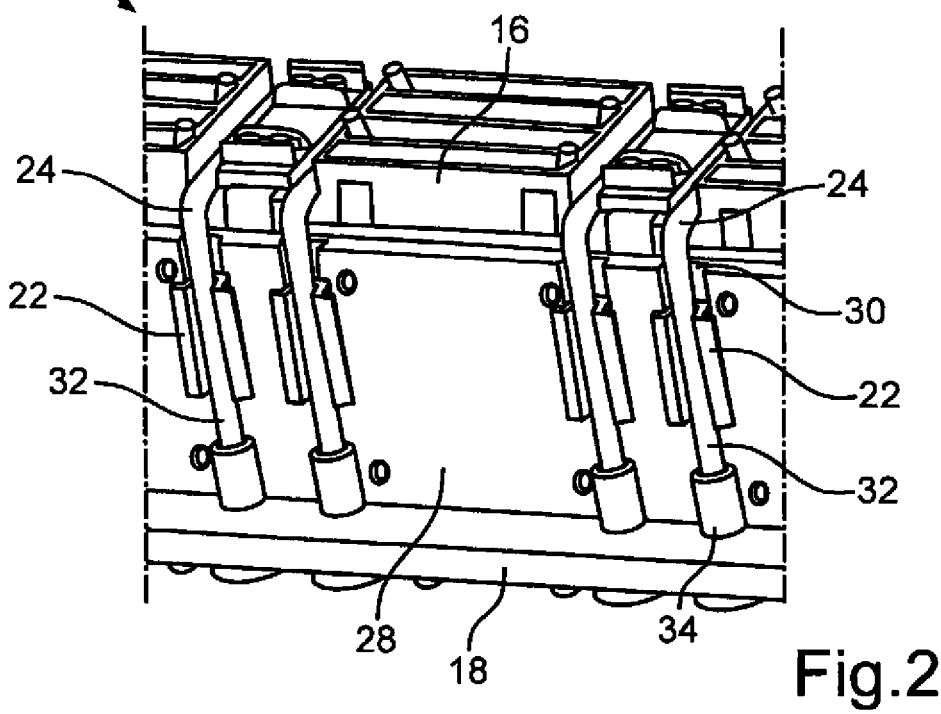
FIG. 2 a cutaway perspective view of the lithium-ion battery according to FIG. 1.

The bracing force can be adjusted and manufacturing tolerances can be compensated particularly well by providing two wedges 20, 22 per bracket 24. The battery 10 preferably includes a plurality of such brackets 24, of which four are shown in FIG. 2 by way of example. The brackets 24 extend through recesses in the head portion 16.

Lower ends of the two legs 32 of a respective bracket 24 are inserted in shafts 34 of screw nuts 36 which have an internal thread and which are inserted from below through openings in the bottom plate 18. By tightening the screw nuts 36, the wedges 20, 22 are fixed in their place in which the cell stack 14 is acted upon by the bracing force. At the same time, the cell stack 14 is securely held in place upon the bottom plate 18 by the bracket 24.

In alternative embodiments, the brackets 24 can also extend through the bottom plate 18 and secured on the underside of the bottom plate 18 with screw nuts. The brackets 24 are preferably formed from a spring steel.

The invention claimed is:

1. A battery formed as an energy store, said battery comprising:
    a bottom plate;
    a plurality of battery cells arranged to form a cell stack which rests on the bottom plate, said battery cells being configured in the shape of a flat block having narrow bottom sides which stand on the bottom plate;
    two side plates located at two opposite lateral sides of the cell stack and having two first surfaces facing toward the cell stack and also having two second surfaces facing away from the cell stack and provided with two longitudinal vertical grooves with a wedge shape;
    two wedges separate from the sides plates and located in the longitudinal vertical grooves of the side plates and also having a wedge shape such that the wedge shape of each of the grooves of the side plates and the wedge shape of each of the wedges complement each other, the two wedges being elongated in a vertical direction and bracing the battery cells of the cell stack against each other such that a force acts on contacting sides of the battery cells to hold the cell stack together; wherein said wedges are pushable downwards in the longitudinal vertical grooves of the side plates so as to adjust the force of bracing the battery cells against each other, and at least one bracket mounted on the bottom plate and securing the two wedges and the cell stack in their position in relation to the bottom plate, said at least one bracket having a U-shaped configuration with two vertical legs and spanning the cell stack, wherein the two wedges are located between the side plates at the opposite vertical sides of the cell stack and the vertical legs of the at least one bracket and wherein the two wedges are located inside the longitudinal vertical grooves of the sides plates and are guided in the longitudinal vertical grooves of the side plates and also embrace the vertical legs of the at least one bracket from outside and are guided on the vertical legs of the at least one bracket.

2. The battery of claim 1, further comprising at least one of a screw nut or screw for securing the at least one bracket upon the bottom plate.

3. The battery of claim 1, wherein the at least one bracket is formed from a spring steel.

4. The battery of claim 1, wherein the at least one bracket is configured to elastically compensate a force of 1 kN to 5 kN acting thereupon, or to resist without destruction a force which acts thereon and is a multiple of an elastically compensatable force.

5. The battery of claim 1, wherein the at least one bracket is configured to resist without destruction a force which acts thereon and is 10 times to 15 times of an elastically compensatable force.

6. The battery of claim 1, wherein each of the wedges embraces one of the vertical legs of the at least one bracket.

7. The battery of claim 1, wherein the wedges have inclined wedge surfaces extending downwards.

8. The battery of claim 1, further comprising hollow shafts inserted into openings of the bottom plate and laterally abutting against the side plates, the vertical legs of the bracket being received in the hollow shafts.

9. The battery of claim 1, wherein the bracket has a portion connecting the legs with each other and extending through a recess in a head portion of the cell stack.

* * * * *